Jan. 7, 1936.  J. MANNIX  2,026,643
FIELD MOUNTING FOR DYNAMO ELECTRIC MACHINES
Filed July 13, 1934   2 Sheets-Sheet 1
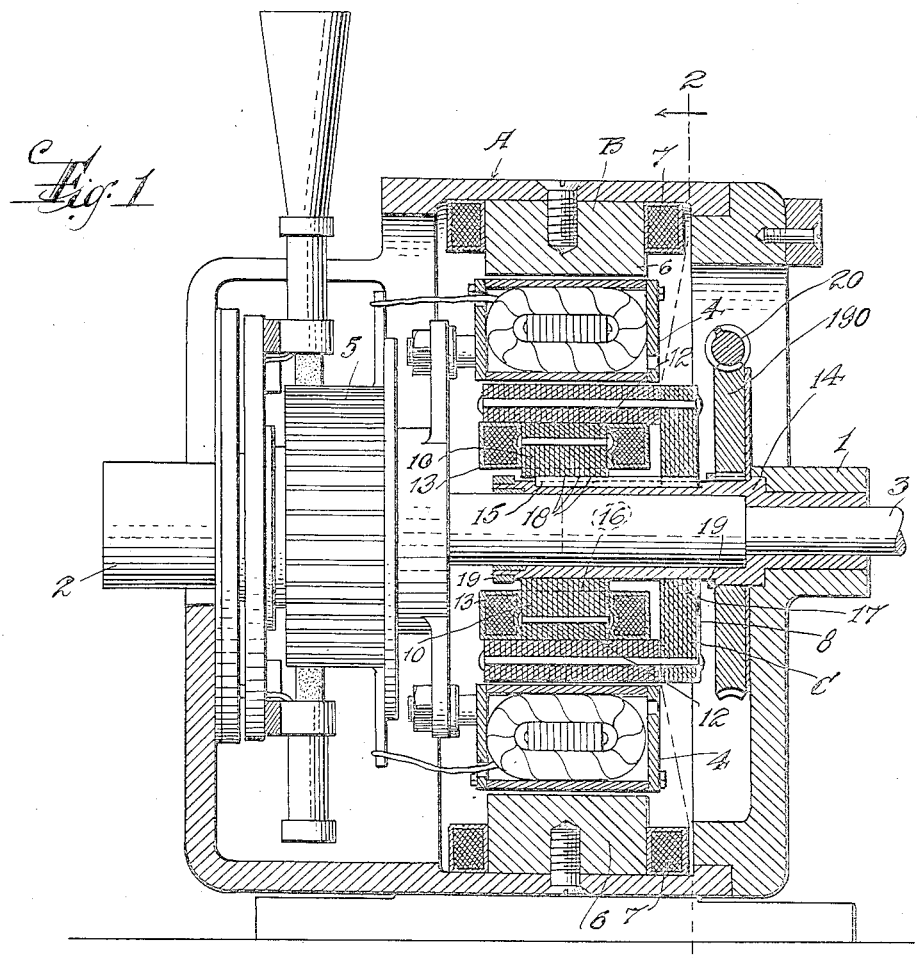
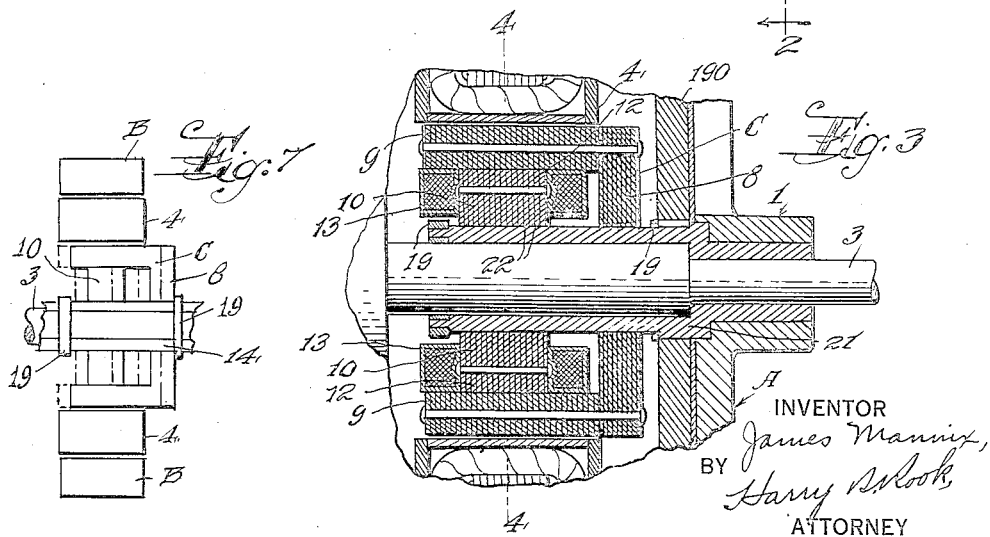
INVENTOR
James Mannix,
BY Harry B. Rook,
ATTORNEY Jan. 7, 1936.                J. MANNIX                2,026,643
             FIELD MOUNTING FOR DYNAMO ELECTRIC MACHINES
                    Filed July 13, 1934        2 Sheets-Sheet 2
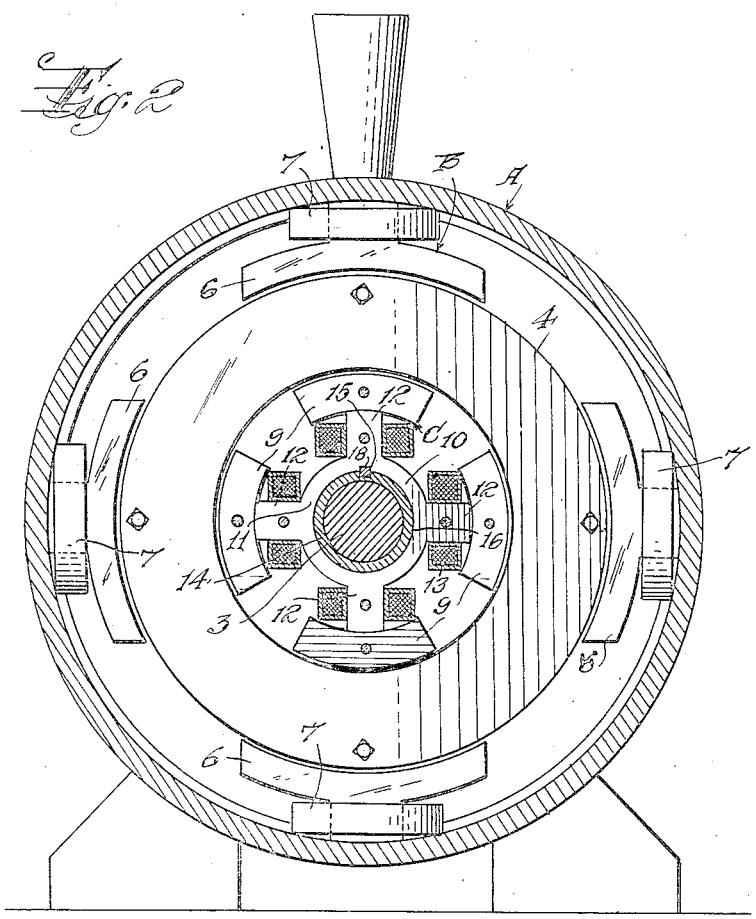
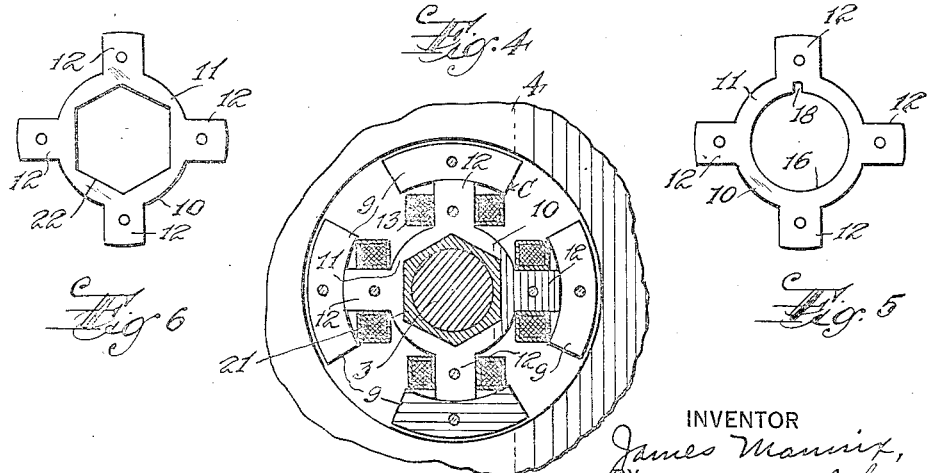
INVENTOR
James Mannix,
BY
Harry S. Cook,
ATTORNEY Patented Jan. 7, 1936

2,026,643

UNITED STATES PATENT OFFICE 2,026,643

FIELD MOUNTING FOR DYNAMO-ELECTRIC MACHINES

James Mannix, Trenton, N. J.

Application July 13, 1934, Serial No. 734,923

4 Claims. (Cl. 172—36)

This invention relates in general to a dynamo-electric machine of the general type described in Patent No. 1,856,147 which has an annular armature and a field divided into two sections one section being disposed within the armature coaxially therewith and the other section surrounding the armature in concentric relation thereto. Each section of the field includes at least two opposite poles, and one of the sections is rotatable, generally the inner section, so that the poles of the inner section can be moved relatively to the poles of the outer section to vary the extent of the magnetic field actuating the armature so as to vary the speed of rotation of the armature.

In the operation of a motor of this general character, considerable noise and chattering has been encountered and considerable strain on the mounting of the movable field section has resulted. I have discovered that these objections to the motor have arisen from the tendency of the rotatable field section to move along its axis to bring its magnetic field into alinement with the magnetic fields of the outer section and the armature. In the motors shown in the above-mentioned patent the inner field section is positively held against longitudinal movement or movement along its axis so that the tendency of the inner field section to move longitudinally along its axis to bring its magnetic center into alinement with the magnetic centers of the armature and the outer field section, causes vibration of the field section and its mounting means which results in both noise and strain on the mounting.

One object of my invention is to provide a novel and improved mounting for the rotatable field section whereby said section may freely move along its axis to permit automatic alinement of its magnetic center with the magnetic centers of the outer field section and the armature.

Another object is to provide a novel and improved mounting for the rotatable field section of a motor of the character described which shall comprise a shaft coaxial with the armature and the outer field section, means for mounting the rotatable inner field section on the shaft so that said field section may freely move longitudinally of the shaft, and means for rotating the shaft so as to rotate the inner field relative to the outer field to vary the speed of the motor. Other objects, advantages and results of the invention will appear from the following description.

Referring to the drawings in which corresponding and like parts are designated throughout the several views by the same reference characters, Figure 1 is a vertical longitudinal sectional view through a motor embodying my invention.

Figure 2 is a transverse vertical sectional view on the line 2—2 of Figure 1.

Figure 3 is a fragmentary longitudinal vertical sectional view showing a modification of the mounting of the rotatable field section.

Figure 4 is a transverse vertical sectional view on the line 4—4 of Figure 3,

Figures 5 and 6 are plan views of the laminations forming parts of the inner field cores shown in Figures 1 and 3 respectively, and Figure 7 is a schematic sectional view showing the manner in which the inner field section may automatically adjust itself longitudinally of the shaft.

For the purpose of illustrating the principles of my invention, I have shown it in connection with a motor of the type shown in Patent No. 1,856,147 to which reference may be had for a detailed description of the structure and operation of the motor. The present invention is concerned only with the mounting of the inner field section relative to the armature and the outer field section, and therefore it is unnecessary for a complete understanding of the invention to enter into a discussion of the electrical features and operation of the motor.

The motor includes a frame A having bearings 1 and 2 at opposite ends thereof in which is journaled a shaft 3. An annular armature 4 is mounted on the shaft 3 and its windings are connected to a commutator 5 in the usual manner.

The outer field section of the motor is generally designed B and is shown as comprising four pole pieces 6 and corresponding windings 7. The poles 6 of the outer field section are disposed outside of the armature and concentric therewith.

The inner field section is generally designated C and comprises a base piece 8 from one side of which project four pole shoes 9, each in juxtaposition to one of the poles 6 of the outer section. Within the pole shoes 9 is arranged a core section 10 which is approximately cross-shaped and includes a ring portion 11 and four radiating arms 12. A winding 13 is mounted on each of the arms 12 as clearly shown in Figures 1 and 4.

For rotatably mounting the inner field section and permitting movement thereof along its axis, I have shown a tubular shaft, sleeve or bushing 14 rotatably mounted upon the shaft 3. The diameter of the opening 16 through the core section 10 is slightly greater than the exterior diameter of the bushing 14, and the base 8 of the inner field section has an opening 17 of the same size. Keyways 18 are formed in the core section 10 and base 8 to receive a key 15 on the bushing. In mounting the inner field section on the bushing, the bushing is slipped through the openings 16 and 17 with the key 15 in the keyways 18, and the field section is free to slide longitudinally of the bushing or along the axis of the field section. Abutment rings 19 formed of suitable material such as bakelite, are secured on the bushing at opposite ends of the field section to limit movement of the latter longitudinally of the bushing.

For rotating the inner field section C, I have shown a worm wheel 190 keyed upon the bushing and meshing with a worm 20 journaled in the frame of the motor. With this construction, rotation of the worm will cause rotation of the worm wheel 190, the bushing 14 and the inner field section C, which, due to the keyed connection with the bushing is caused to rotate therewith.

With this construction it will be observed that the inner field section C has a horizontal floating relationship to the armature and outer field section, and is therefore free to move along its axis under magnetic forces. Each field section and the armature has a magnetic center which is in effect in a plane transverse to the axis thereof, and I have found that for the best operation of the motor these magnetic centers should coincide or align with each other. With my mounting of the inner field section, obviously this section can easily move along its axis to automatically bring its magnetic center into alinement with the magnetic center of the armature and outer field section, as shown by dot and dash lines in Figure 7 where the solid lines indicate one position of the field section and the dot and dash lines indicate another position.

Generally the shaft on which the armature is mounted may slide longitudinally in its bearings so that the magnetic center of the armature may be alined with the magnetic center of the outer field section.

It will also be observed that this adjustment of the inner field section may take place without interference with the rotation of the field section by the worm and worm wheel for the purpose of varying the speed of rotation of the armature.

Instead of providing a keyed connection between the field section C and the bushing 14, the bushing may be polygonal in cross section as indicated at 21 in Figure 4 of the drawings and the core section 11 and base 8 of the inner field section may have openings 22 corresponding in shape to the bushing. Also, of course, the field section might be connected to the bushing with a feather and spline connection.

While I have shown and described my invention as described in a certain type of motor and as embodying details of construction it should be understood that this is primarily for the purpose of illustrating the principles of the invention and that many modifications and changes may be made in the construction and use of the invention without departing from the spirit or scope thereof.

Having thus described my invention, what I claim is:

1. An electric motor including an annular armature, a commutator and brushes, a field including two sections one within the armature and one outside and concentric with the armature, and means mounting said inner field section for free movement along its axis to permit automatic alinement of its magnetic center with the magnetic centers of said outer section and said armature.

2. An electric motor including an annular armature a commutator and brushes, a field including two sections one within the armature and one outside and concentric with the armature, a shaft coaxial with said armature and said outer field section, means for rotating said shaft, and means for mounting said inner field section on said shaft for free movement longitudinally of the shaft to permit said inner field section to automatically aline its magnetic center with the magnetic center of said outer field section and said armature.

3. An electric motor including a frame, an annular armature, a commutator and brushes, a field including two sections one within the armature and one outside and concentric with the armature, a shaft journaled in said frame coaxially with said armature and said outer field section, a worm wheel on said shaft and a worm on said frame for rotating said shaft, and means for mounting said inner field section on said shaft for free movement longitudinally of the shaft to permit said inner field section automatically to aline its magnetic center with the magnetic centers of said armature and said outer field section.

4. An electric motor including an annular armature, a commutator and brushes, a field including two sections one within the armature and one outside and concentric with the armature, and means mounting one of said sections for free movement along its axis to permit automatic alinement of its magnetic center with the magnetic centers of said other section and said armature.

JAMES MANNIX.